US008495938B2

(12) United States Patent
Weber

(10) Patent No.: US 8,495,938 B2
(45) Date of Patent: Jul. 30, 2013

(54) DISPLACEMENT UNIT

(75) Inventor: Guenther Weber, Zachow (DE)

(73) Assignee: Weber Maschinenbau GmbH Breidenbach, Breidenbach (DE)

( * ) Notice: Subject to any disclaimer, the term of this patent is extended or adjusted under 35 U.S.C. 154(b) by 745 days.

(21) Appl. No.: 12/441,736

(22) PCT Filed: Aug. 28, 2007

(86) PCT No.: PCT/EP2007/007509
§ 371 (c)(1),
(2), (4) Date: Mar. 29, 2010

(87) PCT Pub. No.: WO2008/034513
PCT Pub. Date: Mar. 27, 2008

(65) Prior Publication Data

US 2010/0192745 A1 Aug. 5, 2010

(30) Foreign Application Priority Data

Sep. 18, 2006 (DE) ......................... 10 2006 043 697

(51) Int. Cl.
*B23D 19/00* (2006.01)
*B23D 1/14* (2006.01)

(52) U.S. Cl.
USPC ................................. 83/469; 83/663; 83/676

(58) Field of Classification Search
USPC ............................ 83/676, 686, 932, 469, 663
See application file for complete search history.

(56) References Cited

U.S. PATENT DOCUMENTS 4,372,545 A * 2/1983 Federspiel .................... 267/221
5,433,137 A * 7/1995 Ikeda et al. ........................ 92/71
5,768,974 A * 6/1998 Ikeda et al. ........................ 92/71

FOREIGN PATENT DOCUMENTS

DE 32 20 449 A1 12/1983
DE 33 33 492 A1 4/1985
DE 693 06 203 T2 10/1993
DE 101 47 348 A1 4/2003
DE 103 33 661 A1 2/2005
WO WO-03/028963 4/2003
WO WO-2005/009696 2/2005

OTHER PUBLICATIONS

International Search Report dated Nov. 20, 2007. PCT/EP2007/007509.
German Search Report dated Jun. 20, 2007 relating to DE 10 2006 043 697.0.
Preliminary Report on Patentability dated Apr. 16, 2009. PCT/EP2007/007509.

* cited by examiner

*Primary Examiner* — Sean Michalski

(57) ABSTRACT

The present invention relates to a displacement unit, serving to create a translational displacement movement of a cutting head of a cutting machine, particularly a slicer for slicing food products, wherein the head can be attached to the displacement unit. The displacement unit has a housing assembly and an actuator disposed in the housing assembly, the actuator comprising a stationary part in the displacement direction, and a part displaceable in relation to the stationary part in the displacement direction, for carrying out the displacement movement. The displacement unit further has at least one bearing that is attached to the housing assembly and is elastically deformable in the displacement direction, the displaceable part engaging on this bearing.

24 Claims, 2 Drawing Sheets

DISPLACEMENT UNIT

CROSS-REFERENCE TO RELATED APPLICATIONS

Figure 1:
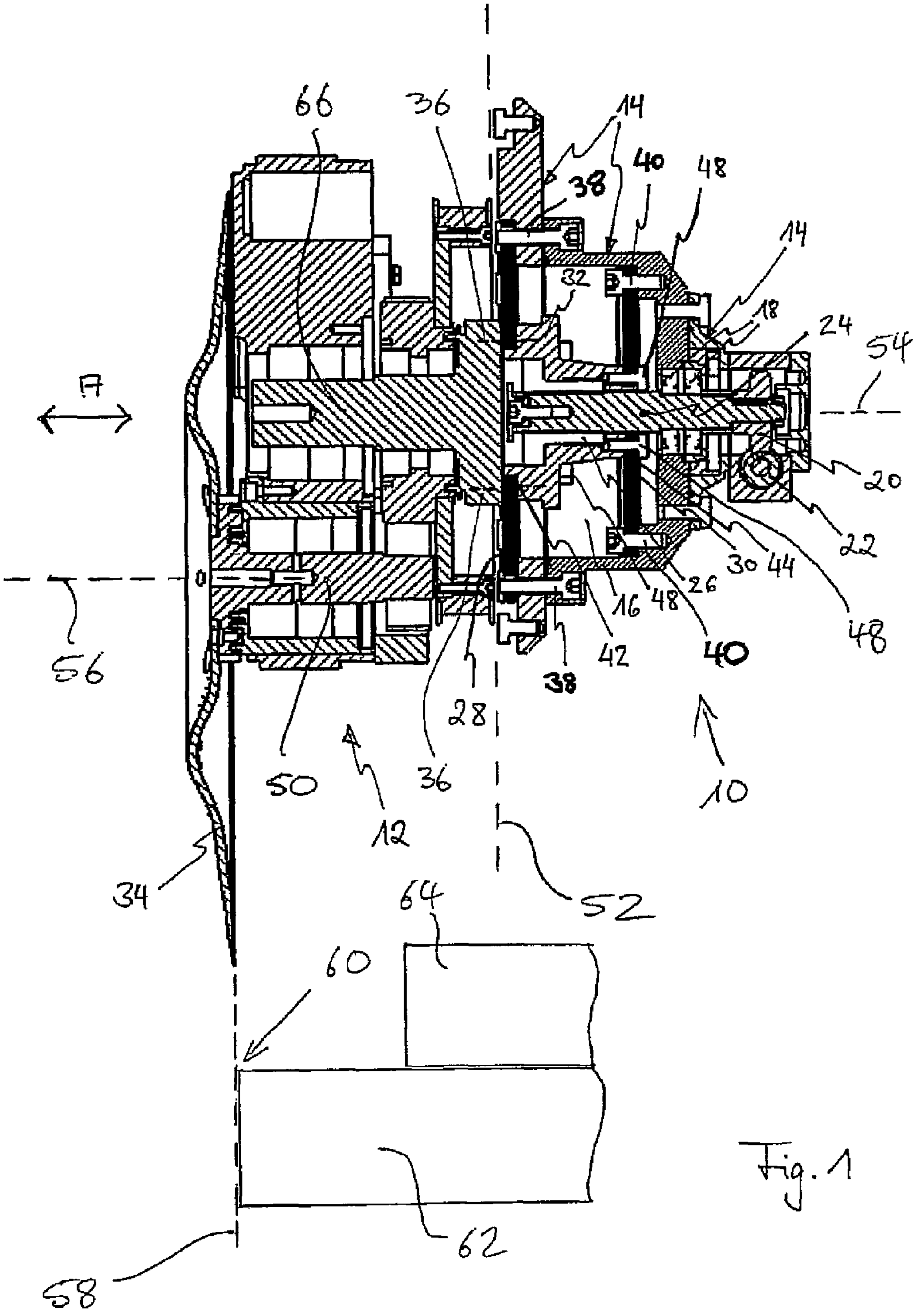

This application is the U.S. national phase of PCT/EP2007/007509 filed Aug. 28, 2007, which claims priority of German Patent Application No. DE 10 2006 043 697.0 filed Sep. 18, 2006.

The present invention relates to an adjustment unit for the production of a translatory adjustment movement of a knife head of a cutting machine, in particular of a slicer for the cutting up of food products, the knife head being attachable to the adjustment unit.

For the cutting up of food products such as cheese products, sausage products and ham products present in the form of product loaves, the product loaves are transported on a feed to a cutting edge where they are cut into product slices by means of the cutting knife of a cutting head of a cutting machine. In this cutting process, it is desirable for different reasons to set the cutting gap which is defined by the spacing between the knife plane and the cutting edge to a defined dimension. It can furthermore be desirable to carry out blank cuts during the cutting process, which likewise requires an adjustment of the knife or of the knife head relative to the product feed or cutting edge.

The setting of the cutting gap or the mentioned relative adjustment between the knife or the knife head and the product feed or cutting edge can be carried out, for example, in that the feed or the cutting edge formed by the feed is displaced relative to the knife plane. Alternatively to this, the setting of the cutting gap can also be carried out in that the knife head is moved relative to the cutting edge using an adjustment device.

Such an adjustment device is an adjustment mechanism which is separate as a rule and which has an actuator for the carrying out of the setting movement.

Since slicers for the cutting up of food products are high precision machines, the displaceable parts of the actuator must be stored with high precision, for which purpose sliding bearings or roller element bearings are frequently used in known adjustment devices. The named journaling of the actuators using roller element bearings or slide bearings does not, however, satisfy the demands made on the journaling as a rule. For instance, the rolling element bearings used for journaling are prone to wear so that the required precision of the journaling cannot be ensured in the long term. Sliding bearings, in contrast, can practically not be produced from the start with a precision such that the required low tolerances can be observed.

What is worse with the named types of journaling is that the bearings expand differently in comparison with the movable parts of the actuator, which can in particular become noticeable under the environmental conditions prevailing in the processing of food products where up to 70° C. can prevail in the interior of the knife head, whereas the environmental temperature in the processing of food products only lies in the range between 5° and 15°.

It is therefore the object of the present invention to improve the journaling of the actuator of an adjustment unit such that the preset journaling tolerances can be observed in the long term without any losses in the precision of the adjustment movement.

In accordance with the invention, an adjustment unit is proposed for the generation of a translatory adjustment movement of a knife head of a cutting machine, in particular of a slicer for the cutting up of food products, the knife head being attachable to the adjustment unit, said adjustment unit having a housing assembly, an actuator arranged therein as well as a specially made bearing for the actuator. The actuator is in this respect made up among other things of a part stationary in the direction of adjustment and a part which is movable in the adjustment direction with respect to the stationary part and which is made to carry out the adjustment movement. The bearing is made elastically deformable in the direction of movement and is fastened to the housing assembly for the realization of the movable journaling required in the adjustment direction so that the adjustment movement of the movable part engaging at the bearing can be equalized with respect to the housing assembly by the bearing elastically deformable per se.

Unlike the known bearing types using roller element bearings or sliding bearings, no relative movement takes place between the bearing and the moving part of the actuator with the journaling in accordance with the invention by means of bearings elastically deformable per se. The required movement equalization rather takes place in that the bearing compensates the adjustment movement of the movable part of the actuator as a result of its deformability.

Since this deformation of the bearing takes place in the elastic range, no wear phenomena beyond this occur either. The elastically deformable bearing rather always returns to its non-deformed starting position as a result of its resilience without being subject to any long-term deformations in this respect which could result in the permitted tolerances being exceeded.

Unlike the known journaling type using rolling element bearings, the bearings in accordance with the invention have long-term shape stability based on their elastic deformability so that the bearings are not subject to any wear or abrasion phenomena and thus also do not have to be replaced after a long-term and long operational use of the adjustment unit in accordance with the invention.

As can be seen from the above statements, the movable part of the actuator engages at the elastically deformable bearing. Where it is stated within the framework of the present application that the movable part engages at the bearing in accordance with the invention, this does not necessarily mean that the movable part is directly fastened to the elastically deformable bearing; the moving part is rather only in kinematic operative connection with the elastically deformable bearing such that it moves in the adjustment direction together with the bearing by an actuation by means of the stationary part of the actuator. In other words, further components can be interposed between the movable part of the actuator and the bearing which establish a coupling between the movable part of the actuator and the bearing to ensure the operative connection between these two components.

Preferred embodiments of the invention are set forth in the dependent claims, in the description and in the drawing.

In a preferred aspect of the invention, the knife head is releasably or replaceably attachable to the adjustment unit. In this respect, the knife head and the adjustment unit thus do not form a common sub-assembly, but a respective separate sub-assembly The knife head is a separate sub-assembly which is coupled to the adjustment unit as a whole and can also be removed from it again. It is thus in particular possible to use a single adjustment unit with a plurality of different knife heads.

The adjustment unit in particular has an interface with which a knife head made as a separate sub-assembly can be coupled. This interface is in particular provided at the actuator, with the movable part of the actuator preferably forming the interface.

The coupling between the knife head and the adjustment unit in particular takes place by a screw connection.

In accordance with a further embodiment of the invention, the bearing includes a radially outer region and a radially inner region, with the bearing being fastened to the housing assembly at the radially outer region and engaging at the movable part at the radially inner region. The bearing is thus outwardly fastened, in particular clamped, and cooperates inwardly with the actuator or its movable part. Forces acting on the bearing via the knife head in the radial direction can thus be taken up by the radially outwardly disposed housing assembly to which the radially outer region of the bearing is fastened.

Provision is furthermore in particular made in accordance with the invention that the bearing is fastened to a housing assembly which is stationary during the cutting operation and relative to which a cutting knife of the knife head moves, in particular, in a rotating manner during the cutting operation. The housing assembly and the bearing fastened thereto are consequently stationary or static components, i.e. with a cutting knife which, for example, rotates during the cutting operation, the housing assembly and the bearing do not rotate. This is achieved by the separation between the adjustment unit, on the one hand, and the knife head, on the other hand.

The actuator can be an adjustment device either made for manual actuation or motor driven.

The adjustment device of the adjustment unit thus extends in accordance with a preferred embodiment in an axial direction, which is understood within the framework of the present invention as a parallel alignment to an axis of rotation of a cutting knife of a knife head attachable to the adjustment unit which rotates during operation. In contrast, the bearing is made substantially non-deformable in the radial direction, that is perpendicular to the adjustment direction, so that the required dimensional stability can be observed in the desired manner in the radial direction. In other words, the bearing in accordance with the invention has an anisotropic deformation behavior considered globally which permits deformations in the axial direction, but conversely prevents radial deformations as a result of the stiffness of the bearing in this direction. The radial stiffness of the bearing provides that the considerable transverse forces acting during the operation of the knife head can be taken up without a transposition of the axis of rotation in the radial direction having to be feared.

The desired elastic deformability of the bearing in the axial direction can be ensured in accordance with a particular embodiment in that, for example, the bearing includes at least one bearing element which is clamped projecting freely at the housing assembly perpendicular to the adjustment direction, with the movable part of the actuator engaging in the previously described manner at the projection or at the free end of the projection. The bearing thus acts so-to-say as a spring element whose spring effect is due to the modulus of elasticity in conjunction with the cross-sectional values and cross-sectional dimensions of the freely projecting part of the bearing.

The bearings could thus, for example, be a plurality of projecting rod elements at whose respective free ends the movable part of the actuator engages.

In accordance with a further special embodiment of the present invention, the bearing element can, however, also be an areal body whose surface normal extends in the axial direction and which is clamped fixedly to the housing assembly along its periphery. With this embodiment of the bearing element as an areal body, the mentioned anisotropism with respect to the deformation behavior of the bearing can be achieved solely due to its design. The areally made bearing body will thus behave relatively stiffly and with low deformation due to its comparatively large cross-sectional area considered in the radial direction, whereas the areally made bearing body behaves rather softly and so deformably in the axial direction due to the moment of inertia of an area effective in the axial direction so that the desired anisotropic deformation behavior can be achieved solely due to the shape of the bearing element.

In accordance with a further special embodiment of the adjustment unit in accordance with the invention, the bearing element can be made, for example, as a sheet metal, in particular as a steel sheet metal, which proves to be advantageous due to the deformation behavior in the elastic range characteristic for metallic materials. The elastic behavior can thus be due singly and solely to the resilience of the material and to the freely projecting journaling with clamping at one side so that no additional measures have to be taken to give the bearing the desired elastically deformable property.

To ensure a particularly reliable journaling of the movable part of the actuator so that it can only move axially, but not in any direction radially, the areal bearing body can have an opening which is defined by the free end of the projection in the areal body. The projection or the free end of the projection is thus so-to-say a marginal region which is closed in itself and which defines the opening of the areal body.

The bearing can thus, for example, be a sheet metal ring which is fixedly clamped at its outer periphery to the housing assembly and at whose inner periphery, which is formed by the named marginal region, the moving part of the actuator engages. In this manner, the movable part of the actuator can be supported uniformly by the bearing in the radial direction, whereby an eccentric deformation of the movable part of the actuator can be countered.

The bearing can have a plurality of metal sheets which are laminated to form a sheet metal package in a preferred aspect of the invention. If the bearing is represented by sheet metal rings, they are laminated concentrically on one another so that the respective openings of the sheet metal rings are aligned with one another. The design of the bearing as a sheet metal package having a plurality of metal sheets laminated in a planar manner on one another in this respect in particular proves to be advantageous to the effect that the stiffness of the bearing is substantially increased in the radial direction.

In accordance with yet another embodiment, the adjustment unit in accordance with the invention has at least two bearings which are each fastened to the housing assembly, which are elastically deformable in the adjustment direction and which are arranged spaced apart from one another in the adjustment direction and at which the movable part of the actuator respectively engages in the previously described manner, namely indirectly, for example. Such a journaling of the movable part of the actuator via at least two bearing elements in accordance with the invention such as was described in the preceding sections proves to be advantageous in that possible canting of the movable part of the actuator can thereby be prevented. The second bearing could admittedly also be realized in the form of the initially described roller element bearing or sliding bearing, but, as described above, the dimensional stability of the bearing cannot be maintained in the long terra with them, which can in turn result in a canting of the movable part of the actuator.

As can be seen from the above statements, the dimensional stability and the observation of preset tolerance values of the journaling can play a role in the journaling in accordance with the invention. Accordingly, the bearing metal sheets can be made as laser cut ring-shaped sheet metal blanks since very exact components with dimensional stability can be produced using a laser controlled cutting process.

In accordance with a further embodiment of the adjustment unit in accordance with the invention, the stationary part of the actuator includes a drivable threaded spindle, whereas the movable part of the actuator includes a spindle nut which cooperates kinematically with the threaded spindle and which can be moved in translation by actuation of the threaded spindle in the adjustment direction, that is in the axial direction. The threaded spindle in this respect has an external thread onto which the internal thread of the spindle nut is screwed so that the spindle nut can be displaced in the longitudinal direction by a rotation of the stationary threaded spindle.

The actuator could admittedly also be made as a piston-in-cylinder unit, for example, with a stationary cylinder and a piston arranged movably thereto. However, the design of the actuator as a threaded spindle with a spindle nut screwed thereon proves to be particularly advantageous due to the self-locking property of such a spindle drive.

The invention additionally relates to an apparatus for the cutting up of food products, in particular to a high-speed slicer, having a knife head which comprises a cutting knife which can be driven to make a cutting movement, in particular a rotating cutting movement, and having an adjustment unit such as is set forth here for the production of a translatory adjustment movement of the knife head.

The adjustment unit and the knife head are preferably made as separate sub-assemblies which are releasably or replaceably connected to one another. In this respect, the adjustment unit can be made as a carrier for the knife head.

In a further embodiment of the invention, an axis of rotation of the cutting knife of the knife head and an axis of rotation of the actuator of the adjustment unit are arranged spaced apart from one another. The cutting knife of the knife head is thus attached eccentrically to the adjustment unit with respect to the actuator.

Provision is furthermore in particular made in accordance with the invention that the adjustment unit is a static or stationary sub-assembly—with the exception of its own adjustment movements. This means that no components of the adjustment unit are forced to move together with the cutting knife of the knife head. Unnecessary movements of components of the adjustment unit are hereby avoided. With a cutting knife which rotates, for example, during the cutting operation, no component of the adjustment unit is thus forced to rotate together with the cutting knife or with another component of the knife head.

The adjustment unit is thus independent of movements which parts of the knife head are capable of, and are in particular independent of a drive for the cutting knife.

Figure 2:
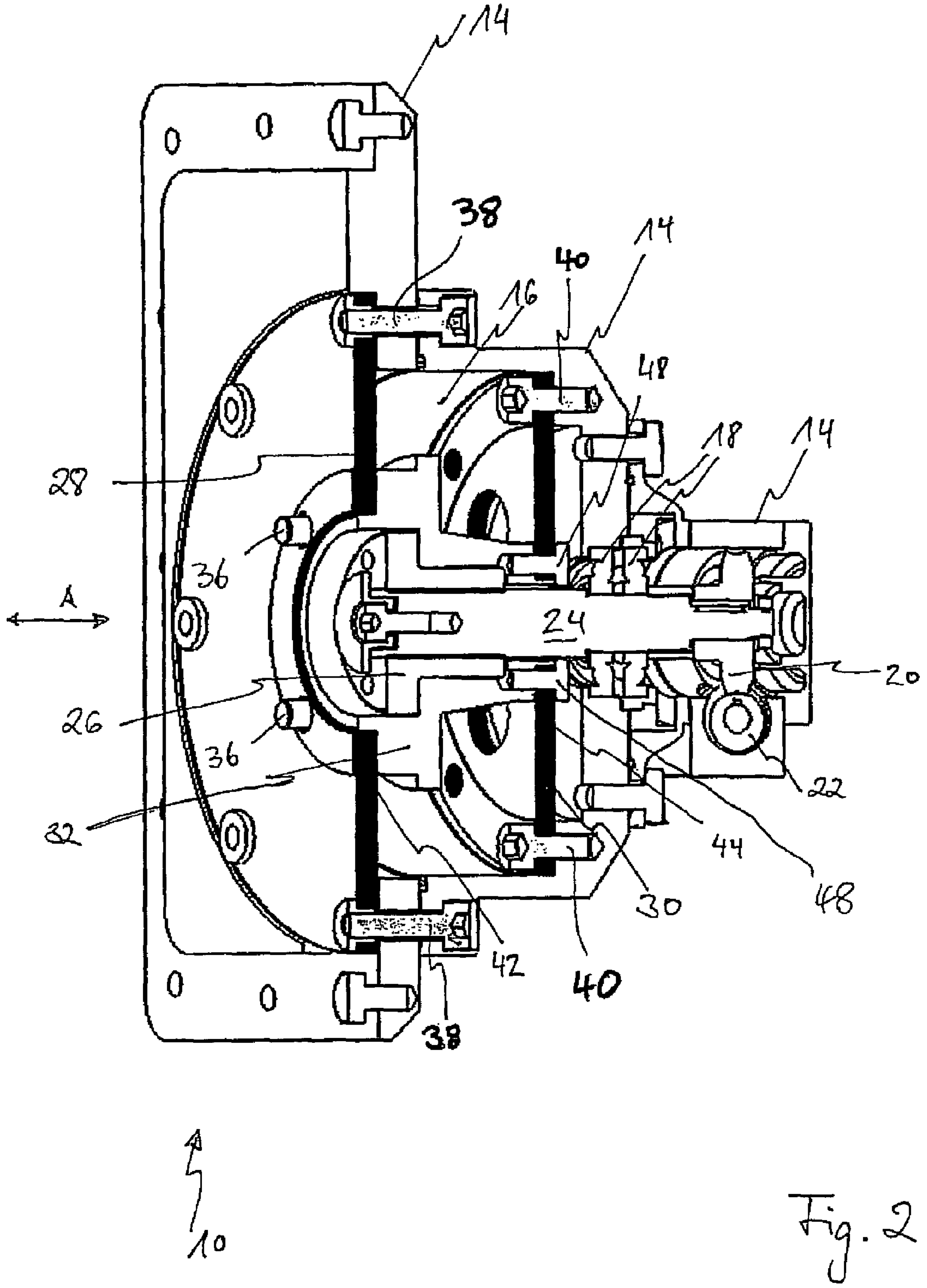

The invention will be described in the following with reference to the enclosed drawings. There are shown:

FIG. 1 a sectional representation through an adjustment unit in accordance with the invention with a knife head connected thereto; and FIG. 2 a perspective representation of the adjustment unit shown in FIG. 1.

In both Figures, the same elements or elements corresponding to one another are marked by the same reference numerals.

FIGS. 1 and 2 show an adjustment unit 10 in accordance with the invention which has a knife head carrier 32 to which a knife head 12 is screwed by means of a screw connection 36 in the representation shown in FIG. 1, with said knife head only being looked at this point to the extent that it has a cutting knife 34 which is to be adjusted in the axial direction A or in the adjustment direction A to carry out a setting of the cutting gap between the knife plane 58 and a cutting edge 60 which is only shown schematically here and which is formed at the end of a product support 62 for a product 64 to be cut up.

The adjustment unit 10 and the knife head 12 are separate sub-assemblies. A separating plane 52 is indicated in FIG. 1 on whose one side the knife head 12 is located and on whose other side the adjustment unit 10 is located. A movable part 32 of an actuator which will be looked at in more detail in the following serves so-to-say as an "interface" between the adjustment unit 10 and the knife head 12. The screw connections 36 serve both for the fastening of a part 28 of a bearing which will likewise be looked at in more detail in the following and for the coupling of the adjustment unit 10 to the knife head 12, and indeed with a holder 66 of the knife head whose middle axis coincides with an axis of rotation 54 of the actuator in the assembled state. The middle axis of the holder 66 is spaced apart in parallel from an axis of rotation 56 of the cutting knife 34. With a knife head 12 attached to the adjustment unit 10, the spindle 50 or the axis of rotation 56 of the cutting knife 34 is arranged eccentrically to the axis of rotation 54 of the actuator of the adjustment unit 10.

The adjustment unit 10 has a housing assembly 14 which is composed of a plurality of housing parts which are flanged to one another using a plurality of screws to cause the housing assembly 14 to arise in combination at whose interior a working space 16 is located.

A spindle drive which includes an axially aligned spindle 24 and a spindle nut 26 screwed thereon is arranged in the working space 16. The spindle 24 is journaled at the inner wall of the housing assembly 14 at the peripheral side via two angular roller element bearings 18 so that it can be caused to make a rotation about its longitudinal axis manually or by motor drive via a worm gear 20 and worm 22. The spindle 24 is in this connection arranged as stationary in the axial direction in the working space 16 so that a rotation of the threaded spindle 24 results in an adjustment movement of the spindle nut 26 in the axial direction.

The spindle nut 26 is surrounded by the knife head carrier 32 which is connected to the spindle nut 26 such that the knife head carrier 32 moves together with the spindle nut 26 on the adjustment movement of the spindle nut in the axial direction. As already previously briefly mentioned, the knife head 12 is fastened to the knife head carrier 32 using the screw connection 36 so that the adjustment movement of the spindle nut 26 can be transmitted to the knife head 12 via the knife head carrier 32.

So that the setting unit composed of the knife head carrier 32 and the spindle nut 26 does not cant in the radial direction, two mutually spaced apart bearings 28, 30 in the form of two sheet metal packages made in accordance with the invention are provided which extend radially inwardly from the housing assembly 14 into the working space 16.

As can in particular be seen from FIG. 2, the sheet metal packages 26, 30 represent a plurality of circular sheet metal rings or sheet metal blanks laminated on one another in planar manner to form sheet metal packages 28, 30, with the sheet metal package 30 having a smaller outer diameter than the sheet metal package 28. The individual sheet metal blanks 26, 30 have concentric openings through which the threaded spindle 24 extends together with the setting unit 26, 32.

As FIG. 2 shows, the individual metal sheets of the sheet metal packages 28, 30 are provided at the peripheral side with respective perforated collars so that the sheet metal packages 28, 30 can be fastened to the housing assembly through these perforations using screw connections 38, 40. The two sheet metal packages 28, 30 are fixedly clamped to the housing assembly 40 using the radially outer screw connections 38, 40 so that the radially inner sections 42, 44 of the sheet metal packages 28, 30 projecting (out) from the housing assembly 14 into the working space 16 show an elastic deformation behavior in the axial direction.

The knife head carrier 32 is fastened to the sheet metal packages 28, 30, in particular to the ends of the projecting sections 44, 42, using radially inner screw connections 48, 36 so that the setting unit 26, 32 is journaled movably with respect to the housing assembly 14 considered in the axial direction. In the radial direction, the bearings 28, 30 or the sheet metal rings forming the sheet metal packages 28, 30 have such a high stiffness, however, that an escape of the setting unit 26, 32 in the radial direction is precluded at least with the forces acting during the operation of the knife head 12.

To carry out an adjustment of the knife head 12, in particular of the cutting knife 34, in the axial direction, the worm 22 is actuated by motor drive or manual drive, whereby the worm gear 20 is driven which in turn on its part causes the spindle 24 to make a rotation about its longitudinal axis. Since the spindle 24 is journaled in a stationary manner in the axial direction, the rotary movement of the spindle 24 has the result that the spindle nut 26, including the knife head carrier 32 attached thereto, is displaced in the axial direction.

Since the spindle nut 26 is connected to the projecting sections 42, 44 of the sheet metal packages 28, 30 via the knife head carrier 32, the axial adjustment movement of the setting unit 26, 32 has the result that the sheet metal packages 28, 30 deform in the axial direction. In the radial direction, in contrast, the sheet metal packages 28, 30 serve as rigid supports for the setting unit 26, 32 so that the setting unit 26, 32 is guided by the journaling at the sheet metal packages 28, 30 movably in the axial direction by the sheet metal packages 28, 30.

Due to the fact that the sheet metal packages 28, 30 have a very high stiffness considered in the radial direction and are thus substantially non-deformable in this direction, the goal of a very dimensionally stable and precise journaling in the radial direction can be achieved without having to accept wear phenomena by relative movements due to a long-term use such as occur in the known journaling processes of the setting unit 26, 32 using roller element bearings or slide bearings. Such relative movements do not occur in the journaling of the setting unit 26, 32 in accordance with the invention since the movement of the setting unit 26, 32 is not compensated by a relative movement with respect to a bearing, for instance, but rather by a deformation of the sheet metal package 28, 30 per se so that no wear phenomena occur as a result of relative movements.

Ultimately, the knife head 12 is adjusted together with the cutting knife 34 in the axial direction A by the movement of the setting unit 26, 32 since the knife head 12 is connected to the knife head carrier 32 via the screw connections 36. A very dimensionally stable, precise and low-wear journaling for the setting unit 26, 32 can thus be ensured with the described realization of the setting unit 10 in accordance with the invention and in particular by the journaling in accordance with the invention in the form of the sheet metal packages 28, 30 so that no replacement of the bearing 28, 30 becomes necessary even after a very high number of hours of operating use.

Reference Numeral List

10 adjustment unit
12 knife head
14 housing assembly
16 working space
18 angular roller element bearing
20 worm gear
22 worm
24 spindle
26 spindle nut
28 bearing/sheet metal package
30 bearing/sheet metal package
32 knife head carrier
34 cutting knife
36 screw connection
38 screw connection
40 screw connection
42 projecting section
44 projecting section
48 screw connection
50 spindle of the knife head
52 dividing plane between the knife head and the adjustment unit
54 axis of rotation of the spindle
56 axis of rotation of the knife head
58 knife plane
60 cutting edge
62 product support
64 product
66 holder
A adjustment direction/axial direction

The invention claimed is:

1. An adjustment unit (10) for the production of a translatory adjustment movement of a knife head (12) of a cutting machine, the knife head being attachable to the adjustment unit, comprising:

a housing assembly (14);

an actuator arranged in the housing assembly (14) and having a part (24) stationary in the adjustment direction and a part (26, 32) movable in the adjustment direction (A) with respect to the stationary part (24) for the carrying out of the adjustment movement; and at least one bearing (28, 30) which is fastened to the housing assembly (14), which is elastically deformable in the adjustment direction (A) and at which the movable part (26, 32) engages, wherein the at least one bearing (28, 30) has a radially outer region and a radially inner region, with the bearing (28, 30) being fastened to the housing assembly (14) at the radially outer region and to the movable part (32) at the radially inner region, and wherein said at least one bearing is fixed to said housing assembly against rotation around said adjustment direction.

2. An adjustment unit in accordance with claim 1, characterized in that the knife head (12) is releasably or replaceably attachable to the adjustment unit (10).

3. An adjustment unit in accordance with claim 1, characterized in that the adjustment unit (10) has an interface with which a knife head (12) made as a separate sub-assembly can be coupled.

4. An adjustment unit in accordance with claim 3, characterized in that the interface is provided at the actuator, in particular at the moving part (32) of the actuator.

5. An adjustment unit in accordance with claim 1, characterized in that the bearing (28, 30) has a radially outer region and a radially inner region, with the bearing (28, 30) being fastened to the housing assembly (14) at the radially outer region and to the movable part (32) at the radially inner region.

6. An adjustment unit in accordance with claim 1, characterized in that the bearing (28, 30) is fastened to a housing assembly (14) stationary during cutting operation relative to which a cutting knife (34) of the knife head (12) moves, in particular rotates, during the cutting operation.

7. An adjustment unit in accordance with claim 1, characterized in that the knife head (12) is attachable to the adjustment device (10) with an axis of rotation of a cutting knife (34) eccentric with respect to an axis of rotation of the actuator of the adjustment unit (10).

8. An adjustment unit in accordance with claim 1, characterized in that the adjustment direction (A) extends parallel to an axis of rotation (56) of a cutting knife (34) of the knife head (12) rotating during operation and the bearing (28, 30) is substantially non- deformable perpendicular to the adjustment direction.

9. An adjustment unit in accordance with claim 1, characterized in that the bearing (28, 30) includes at least one bearing element (28, 30) which is fastened to the housing assembly (14) freely projecting perpendicular to the adjustment direction (A), with the movable part (26, 32) of the actuator engaging at the projection (42, 44).

10. An adjustment unit in accordance with claim 9, characterized in that the bearing element (28, 30) is made as an areal body whose surface is aligned perpendicular to the adjustment direction (A) and which is fixedly fastened to the housing assembly (14) along its periphery.

11. An adjustment unit in accordance with claim 9, characterized in that the bearing element (28, 30) is made as a sheet metal part.

12. An adjustment unit in accordance with claim 9, characterized in that the free end of the projection (42, 44) defines an opening formed in the areal body.

13. An adjustment unit in accordance with claim 1, characterized in that the bearing (28, 30) includes at least one sheet metal ring which is fixedly fastened to the housing assembly (14) at its outer periphery and at whose inner periphery the movable part (26, 32) of the actuator engages.

14. An adjustment unit in accordance with claim 1, characterized in that the bearing (28, 30) includes a plurality of sheet metal parts which are laminated to form a sheet metal package.

15. An adjustment unit in accordance with claim 1, characterized in that the adjustment unit (10) has at least two bearings (28, 30) which are each fastened to the housing assembly (14), which are elastically deformable in the adjustment direction (A), which are arranged spaced apart from one another in the adjustment direction (A) and at which the movable part (26, 32) of the actuator engages.

16. An adjustment unit in accordance with claim 1, characterized in that the stationary part (24) of the actuator includes a drivable threaded spindle (24) and the movable part (26, 32) of the actuator includes a spindle nut (26) which cooperates kinematically with the threaded spindle (24) and which is translatorily movable in the adjustment direction (A) by actuation of the threaded spindle (24).

17. An adjustment unit in accordance with claim 1, characterized in that the bearing metal sheet includes a laser cut ring-shaped sheet metal blank.

18. An apparatus for the cutting up of food products, in particular a high speed slicer, having a knife head (12) which includes a cutting knife (34) which can be driven to make a cutting movement, in particular a rotating cutting movement, and having an adjustment unit (10) in accordance with any one of the preceding claims for the production of a translatory adjustment movement of the knife head (12).

19. An apparatus in accordance with claim 18, characterized in that the adjustment unit (10) and the knife head (12) are made as separate sub-assemblies which are releasably or replaceably connected to one another.

20. An apparatus in accordance with claim 18, characterized in that the adjustment unit (10) is made as a carrier for the knife head (12).

21. An apparatus in accordance with claim 19, characterized in that an axis of rotation (56) of the cutting knife (34) of the knife head (12) and an axis of rotation (54) of the actuator of the adjustment unit (10) extend parallel to one another and are arranged spaced apart from one another.

22. An apparatus in accordance with claim 18, characterized in that the adjustment unit (10) is a static or stationary sub-assembly with the exception of its own adjustment movements.

23. An apparatus in accordance with claim 18, characterized in that the adjustment unit (10) is independent of movements which parts of the knife head (12) are capable of, and are in particular independent of a drive for the cutting knife (34).

24. An apparatus in accordance with claim 18, characterized in that the adjustment unit (10), in particular the bearing (28, 30) of the adjustment unit (10), is decoupled from a drive for the cutting knife (34).

* * * * *